United States Patent [19]
Messner

[11] Patent Number: 5,916,828
[45] Date of Patent: *Jun. 29, 1999

[54] MATERIAL FOR USE IN A CANOPY

[75] Inventor: Mark Matthew Messner, Reading, Pa.

[73] Assignee: Graco Children's Products, Inc., Elverson, Pa.

[ * ] Notice: This patent issued on a continued prosecution application filed under 37 CFR 1.53(d), and is subject to the twenty year patent term provisions of 35 U.S.C. 154(a)(2).

[21] Appl. No.: 08/738,169

[22] Filed: Oct. 25, 1996

[51] Int. Cl.$^6$ .................................................... A47C 7/62
[52] U.S. Cl. ...................... 442/132; 442/232; 442/236; 135/88.01; 297/184.13; 297/184.15
[58] Field of Search ..................... 442/132, 236, 442/232; 135/88.01; 296/77.1, 136; 297/184.13, 184.15

[56] References Cited

U.S. PATENT DOCUMENTS

| | | | |
|---|---|---|---|
| D. 285,880 | 9/1986 | Griesenbeck | D6/383 |
| D. 304,523 | 11/1989 | Dillner et al. | D6/391 |
| 1,951,604 | 3/1934 | Friedlander | 150/52 |
| 2,464,866 | 3/1949 | Holtz | 5/98 |
| 2,486,067 | 10/1949 | Schroeder | 5/99 |
| 2,958,084 | 11/1960 | Kenney | 5/99 |
| 4,296,162 | 10/1981 | Jean | 428/213 |
| 4,766,918 | 8/1988 | Odekirk | 135/96 |
| 4,790,340 | 12/1988 | Mahoney | 135/90 |
| 4,811,437 | 3/1989 | Dillner et al. | 5/99 B |
| 4,852,598 | 8/1989 | Griesenbeck | 135/102 |
| 4,945,584 | 8/1990 | LaMantia | 5/97 |
| 5,163,191 | 11/1992 | Chan | 5/98.1 |
| 5,170,826 | 12/1992 | Carstensen et al. | 150/154 |
| 5,212,841 | 5/1993 | Binnersley | 5/99.1 |
| 5,339,470 | 8/1994 | Shamie | 5/98.1 |
| 5,560,055 | 10/1996 | Ziegler | 5/99.1 |

OTHER PUBLICATIONS

Deborah Blumenthal, "New Lines of Light, Cool Clothing Protect Against the Sun," *The New York Times*, May 22, 1996; Section C; p. 6; col. 1; Living Desk.

*Primary Examiner*—Christopher Raimund
*Attorney, Agent, or Firm*—Morgan, Lewis & Bockius LLP

[57] ABSTRACT

An improved material for use in juvenile products has utility as a canopy covering, for example, a playyard structure or stroller. The improved material substantially blocks visible, infrared, and ultraviolet light from passing through to the child or infant and provides protection from this potentially harmful radiation. Blocking infrared radiation also advantageously prevents heat build up in the juvenile product. The preferred construction includes a fabric layer and a metalized layer to form a lightweight and flexible material.

20 Claims, 13 Drawing Sheets

MATERIAL FOR USE IN A CANOPY

BACKGROUND OF THE INVENTION

1. Field of the Invention

The present invention relates to an improved material for use in a canopy, and in particular, to such a material with improved radiation blocking characteristics for use in a juvenile product.

2. Description of the Related Art

In general, conventional juvenile products include such items as playyards, strollers, bassinets, car seats, walkers, and non-moving entertainment devices. Some juvenile products are even convertible between several functions (e.g, a car seat and a carrying bassinet). Conventional juvenile products are often adapted for convenient outdoor use, and the child (or infant) is often exposed to outdoor elements, including sunlight, heat, and other radiations such as ultraviolet (UV) light and infrared (IR) light.

As is known, children are often very sensitive to the outdoor elements, and must be protected therefrom. In particular, children are often very sensitive to sunlight, UV radiation (which can result in sunburn), and IR radiation (which, in conjunction with the ambient temperature, can overheat the child). Of course, because these sensitivities are well known, the parents or caregivers must constantly monitor the child's status and condition.

Conventional techniques to protect the child have included moving the child under cover, or covering the juvenile product with a cotton fabric canopy. However, these conventional techniques suffer from several disadvantages. Oftentimes, it is not convenient to move the child under cover. Additionally, many conventional cotton canopies are very thin and do not substantially block the light from passing through. Furthermore, conventional cotton canopies do not adequately block UV radiation and/or IR radiation. Although not generally recommended, it has been reported that some parents or caregivers have placed towels or other objects over the juvenile product in an attempt to provide protection for the child. As can be expected, this approach suffers from many additional difficulties, including inadequate ventilation, inconvenient use and storage, and ineffectiveness. As can be seen, these deficiencies and inadequacies often limit the usefulness and convenience of the juvenile product by limiting the extent and conditions of its appropriate use.

SUMMARY OF THE INVENTION

The present invention has been made in view of the above circumstances and has as an object to overcome the deficiencies and inadequacies of the prior art.

A further object of the present invention is to provide a material for use in a canopy which substantially blocks light from passing through it.

Another object of the present invention is to provide a material for use in a canopy which substantially blocks UV and IR radiation from passing through it.

A still further object of the present invention is to provide a material for use in a canopy which minimizes the temperature inside the juvenile product.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the invention comprises a fabric layer and a radiation blocking layer, wherein the radiation layer substantially blocks UV radiation and IR radiation from passing therethrough.

It is to be understood that both the foregoing general description and the following detailed description are exemplary and explanatory only are not restrictive of the invention, as claimed.

BRIEF DESCRIPTION OF THE DRAWINGS

The accompanying drawings, which are incorporated in and constitute a part of this specification, illustrate one embodiment of the invention and together with the description, serve to explain the principles of the invention. In the drawings.

DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

In accordance with the invention, the present invention includes an improved material for use in a canopy of a juvenile product comprising a fabric layer and a radiation blocking layer. An example of a preferred use of the improved material according to the present invention can be found in U.S. patent application Ser. No. 08/738,236, new pending, filed concurrently herewith on Oct. 25, 1996, entitled "Playyard System and Canopy," invented by Steven Glenn Gerhart, the disclosure of which is hereby incorporated by reference.

Figure 1:
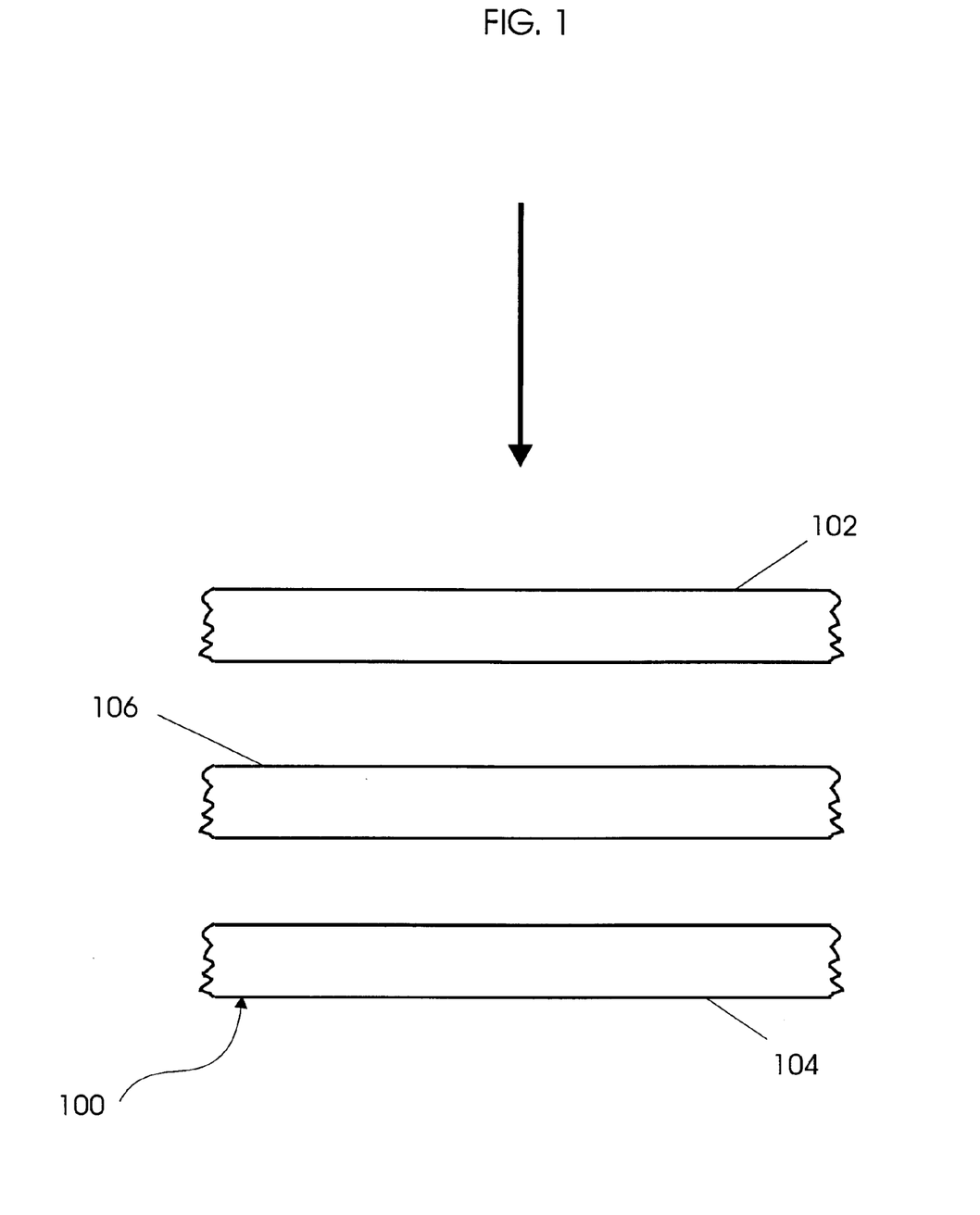
FIG. 1 is an exploded cross-sectional view of a preferred material for use in a canopy in accordance with the present invention.

As embodied herein and shown in FIG. 1, the improved material 100 comprises a fabric material 102 and a radiation blocking layer 104. As shown in FIG. 1, a preferred orientation of the material 100 is to have the radiation (indicated by the downward arrow in FIG. 1) incident on the fabric material 102. The radiation depicted by the arrow generally represents that present in an outdoor environment, including sunlight, UV, and IR radiation. FIG. 1 also shows a preferred bonding layer 106 to bond the fabric layer 102 and the radiation blocking layer 104. The bonding layer 106 is disposed between the fabric layer 102 and the radiation blocking layer 104 and then heated and laminated to achieve appropriate bonding. Most preferably, the bonding layer 106 comprises a polyurethane adhesive (i.e., a powder). It should be appreciated that FIG. 1 is not drawn to scale.

The radiation blocking layer 104 is preferably disposed adjacent to the fabric layer 102, most preferably with a bonding layer 106 therebetween. It should be appreciated, however, that additional layers could be considered. For example, additional layers (not shown) could be added above the fabric layer 102 to add color or create a desired appearance or achieve desired properties. Additionally, bonding could be accomplished by using a carrier material with a bonding agent (not shown) as the bonding layer 106, or a so-called Polyethylene Terephthalate (PET) film process (not shown) could be used to laminate the fabric material 102 and the radiation blocking layer 104.

In accordance with the invention, the fabric layer 102 comprises a 150–210 denier fabric material, preferably 210 denier. The preferred fabric material should provide a lightweight and flexible component for the material 100. For example, a 210 denier nylon, polyester, or polycotton fabric material could be used.

The radiation blocking layer 104 is sufficiently thin to meet the requirements of the present invention, as described infra, while retaining the advantageous properties of flexibility and lightweight properties. The radiation blocking layer 104 preferably comprises an aluminized layer of about 16 microns thick. Of course, it should be understood that other types of radiation blocking layers could be utilized to achieve the primary radiation blocking advantages of the present invention. For example, other metallic materials (preferably not compounded with lead) with appropriate thicknesses could be considered.

The following discussion provides seven examples of tested materials, including several preferred embodiments of the material 100 according to the present invention in a variety of configurations.

The following test data for examples 1–3 were obtained from ETL Testing Laboratories, Inc. of Courtland, New York, and shows UV transmitted for wave lengths ranging from 200 nm to 400 nm. Data was taken for 10 run wavelength intervals at every 25 hours of UV exposure. The transmittance is expressed as a percentage transmittance, or as a blocking percentage (equal to 100 minus the transmittance). For examples 4–7, the test data was also obtained from ETL Labs, and shows IR transmittance for wave lengths ranging from 750 nm to 2500 nm. Data was taken for 50 nm wavelength intervals and transmittance is expressed as a percentage transmittance, or as a blocking percentage.

Of course, it should be appreciated that various averages can be calculated or other calculations performed for the data which follows.

EXAMPLE ONE

Example 1 is directed to a 210 denier multi-colored polycotton fabric test material without a radiation blocking layer.

TABLE I

| UV Wave-length | INITIAL % Transmissivity | 25 HOURS % Transmissivity | 50 HOURS % Transmissivity | 75 HOURS % Transmissivity |
|---|---|---|---|---|
| 200 nm | 0.91 | 1.21 | 1.11 | 1.20 |
| 210 nm | 0.97 | 1.28 | 1.15 | 1.25 |
| 220 nm | 1.02 | 1.35 | 1.21 | 1.30 |
| 230 nm | 1.11 | 1.43 | 1.30 | 1.39 |
| 240 nm | 1.23 | 1.51 | 1.36 | 1.47 |
| 250 nm | 1.36 | 1.62 | 1.46 | 1.54 |
| 260 nm | 1.39 | 1.68 | 1.53 | 1.61 |
| 270 nm | 1.45 | 1.72 | 1.56 | 1.66 |

TABLE I-continued

| UV Wave-length | INITIAL % Transmissivity | 25 HOURS % Transmissivity | 50 HOURS % Transmissivity | 75 HOURS % Transmissivity |
|---|---|---|---|---|
| 280 nm | 1.44 | 1.77 | 1.55 | 1.69 |
| 290 nm | 1.50 | 1.79 | 1.63 | 1.66 |
| 300 nm | 1.55 | 1.82 | 1.67 | 1.81 |
| 310 nm | 1.80 | 2.10 | 2.09 | 1.92 |
| 320 nm | 3.21 | 4.21 | 4.66 | 4.64 |
| 330 nm | 3.75 | 5.56 | 5.67 | 5.50 |
| 340 nm | 3.82 | 5.84 | 6.20 | 5.91 |
| 350 nm | 3.92 | 6.27 | 6.71 | 6.37 |
| 360 nm | 4.29 | 7.20 | 7.76 | 7.40 |
| 370 nm | 4.68 | 8.24 | 8.97 | 8.61 |
| 380 nm | 6.04 | 10.26 | 11.10 | 10.70 |
| 390 nm | 7.77 | 12.09 | 12.99 | 12.59 |
| 400 nm | 12.61 | 16.26 | 17.11 | 16.49 |

TABLE II

| UV Wave-length | INITIAL % Transmissivity | 25 HOURS % Transmissivity | 50 HOURS % Transmissivity | 75 HOURS % Transmissivity |
|---|---|---|---|---|
| 200 nm | 0.88 | 1.34 | 1.30 | 1.30 |
| 210 nm | 0.93 | 1.39 | 1.39 | 1.38 |
| 220 nm | 0.99 | 1.46 | 1.46 | 1.44 |
| 230 nm | 1.06 | 1.57 | 1.58 | 1.54 |
| 240 nm | 1.18 | 1.67 | 1.69 | 1.63 |
| 250 nm | 1.33 | 1.78 | 1.79 | 1.73 |
| 260 nm | 1.41 | 1.86 | 1.88 | 1.81 |
| 270 nm | 1.43 | 1.90 | 1.93 | 1.84 |
| 280 nm | 1.45 | 1.93 | 1.98 | 1.92 |
| 290 nm | 1.60 | 1.97 | 2.01 | 1.97 |
| 300 nm | 1.72 | 2.00 | 2.01 | 1.97 |
| 310 nm | 1.86 | 2.30 | 2.51 | 2.09 |
| 320 nm | 4.54 | 5.01 | 6.07 | 5.12 |
| 330 nm | 5.52 | 6.40 | 8.33 | 6.86 |
| 340 nm | 5.57 | 6.77 | 8.98 | 7.41 |
| 350 nm | 5.67 | 7.30 | 9.83 | 8.10 |
| 360 nm | 6.07 | 8.36 | 11.61 | 9.52 |
| 370 nm | 6.33 | 9.47 | 13.50 | 11.15 |
| 380 nm | 7.47 | 11.44 | 16.30 | 13.65 |
| 390 nm | 8.33 | 13.09 | 17.83 | 15.58 |
| 400 nm | 11.48 | 17.34 | 22.56 | 20.23 |

Figure 2A:
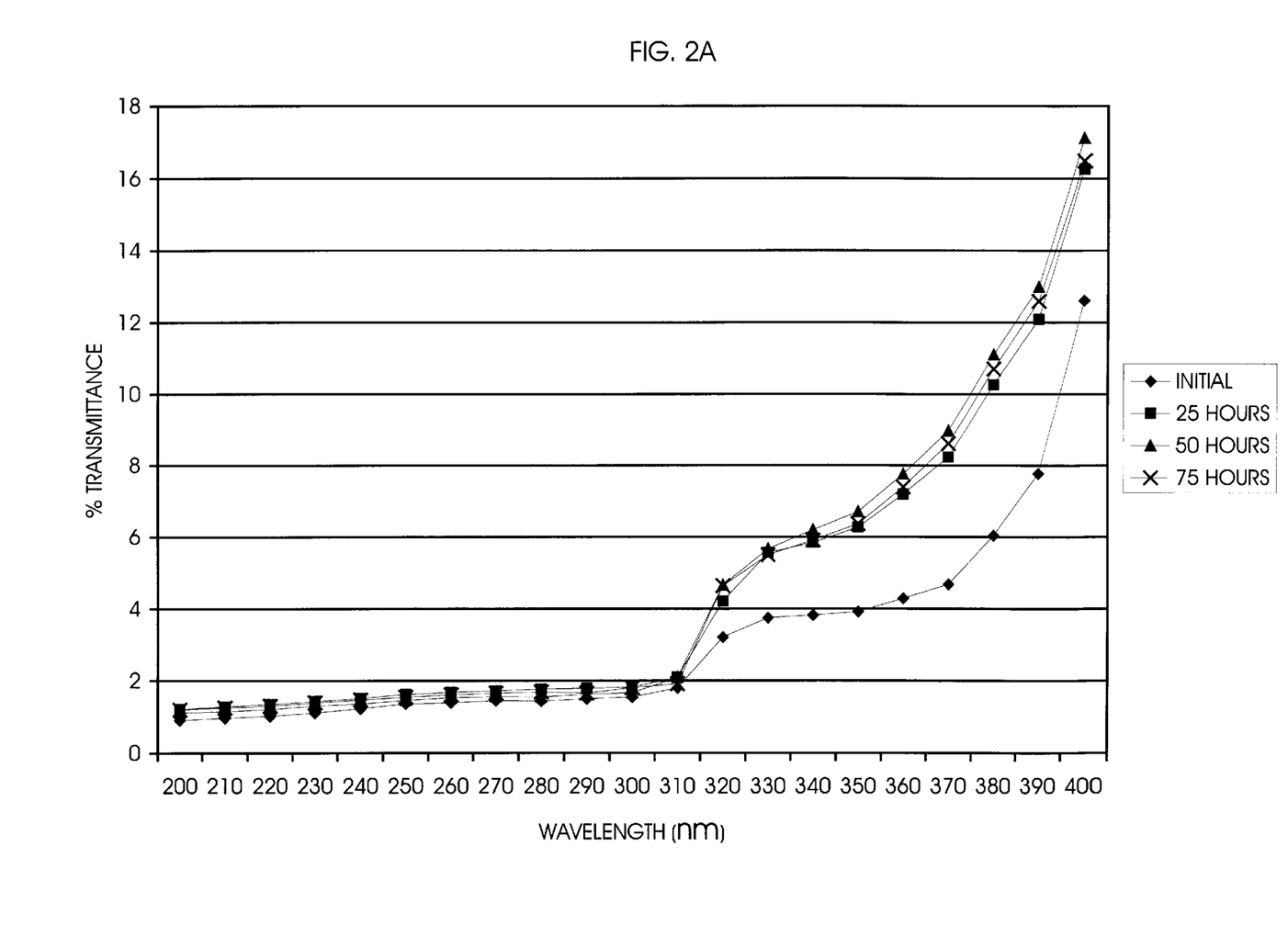
FIGS. 2A and 2B are graphs of the test data from Example 1.
Figure 2B:
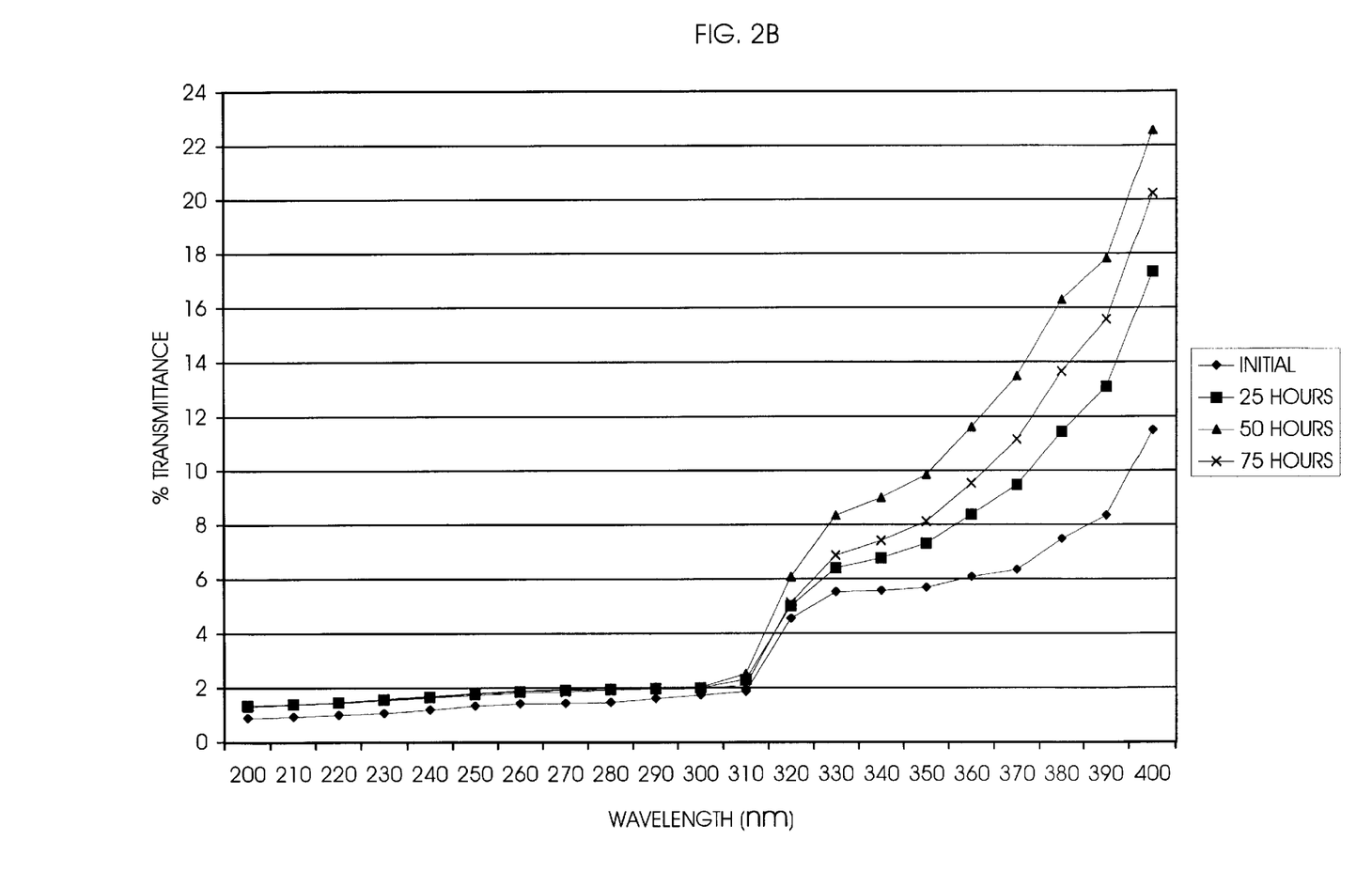

The data from Tables I and II is graphically shown in FIGS. 2A and 2B. As can be seen, the transmittance of UV rapidly increases above about the 310 nm wavelength. The data in Tables I and II represent identical tests on identical material, and accordingly any differences between measurements represent experimental error.

EXAMPLE TWO

The following Tables III and IV show data for a 210 denier multi-colored polycotton fabric including a radiation blocking layer (aluminized) with the printed side exposed to the radiation.

TABLE III

| UV Wave-length | INITIAL % Transmissivity | 25 HOURS % Transmissivity | 50 HOURS % Transmissivity | 75 HOURS % Transmissivity |
|---|---|---|---|---|
| 200 nm | 0.00 | 0.00 | 0.00 | 0.00 |
| 210 nm | 0.00 | 0.00 | 0.00 | 0.00 |
| 220 nm | 0.00 | 0.00 | 0.00 | 0.00 |
| 230 nm | 0.00 | 0.00 | 0.00 | 0.00 |
| 240 nm | 0.00 | 0.00 | 0.00 | 0.00 |
| 250 nm | 0.00 | 0.00 | 0.00 | 0.00 |

TABLE III-continued

| UV Wavelength | INITIAL % Transmissivity | 25 HOURS % Transmissivity | 50 HOURS % Transmissivity | 75 HOURS % Transmissivity |
|---|---|---|---|---|
| 260 nm | 0.00 | 0.00 | 0.00 | 0.00 |
| 270 nm | 0.00 | 0.00 | 0.00 | 0.00 |
| 280 nm | 0.00 | 0.00 | 0.00 | 0.00 |
| 290 nm | 0.00 | 0.00 | 0.00 | 0.00 |
| 300 nm | 0.00 | 0.00 | 0.00 | 0.00 |
| 310 nm | 0.00 | 0.00 | 0.00 | 0.00 |
| 320 nm | 0.00 | 0.02 | 0.01 | 0.01 |
| 330 nm | 0.03 | 0.03 | 0.02 | 0.00 |
| 340 nm | 0.03 | 0.03 | 0.03 | 0.01 |
| 350 nm | 0.04 | 0.05 | 0.04 | 0.02 |
| 360 nm | 0.05 | 0.07 | 0.07 | 0.04 |
| 370 nm | 0.06 | 0.11 | 0.11 | 0.07 |
| 380 nm | 0.09 | 0.15 | 0.16 | 0.11 |
| 390 nm | 0.13 | 0.20 | 0.21 | 0.16 |
| 400 nm | 0.25 | 0.31 | 0.33 | 0.24 |

TABLE IV

| UV Wavelength | INITIAL % Transmissivity | 25 HOURS % Transmissivity | 50 HOURS % Transmissivity | 75 HOURS % Transmissivity |
|---|---|---|---|---|
| 200 nm | 0.00 | 0.00 | 0.00 | 0.00 |
| 210 nm | 0.00 | 0.00 | 0.00 | 0.00 |
| 220 nm | 0.00 | 0.00 | 0.00 | 0.00 |
| 230 nm | 0.00 | 0.00 | 0.00 | 0.00 |
| 240 nm | 0.00 | 0.00 | 0.00 | 0.00 |
| 250 nm | 0.00 | 0.00 | 0.00 | 0.00 |
| 260 nm | 0.00 | 0.00 | 0.00 | 0.00 |
| 270 nm | 0.00 | 0.00 | 0.00 | 0.00 |
| 280 nm | 0.00 | 0.00 | 0.00 | 0.00 |
| 290 nm | 0.00 | 0.00 | 0.00 | 0.00 |
| 300 nm | 0.00 | 0.01 | 0.00 | 0.00 |
| 310 nm | 0.01 | 0.01 | 0.00 | 0.00 |
| 320 nm | 0.02 | 0.02 | 0.02 | 0.00 |
| 330 nm | 0.05 | 0.04 | 0.03 | 0.00 |
| 340 nm | 0.05 | 0.05 | 0.04 | 0.01 |
| 350 nm | 0.06 | 0.06 | 0.06 | 0.03 |
| 360 nm | 0.08 | 0.10 | 0.09 | 0.06 |
| 370 nm | 0.11 | 0.15 | 0.15 | 0.11 |
| 380 nm | 0.15 | 0.21 | 0.21 | 0.17 |
| 390 nm | 0.21 | 0.27 | 0.29 | 0.23 |
| 400 nm | 0.42 | 0.42 | 0.41 | 0.34 |

Figure 3A:
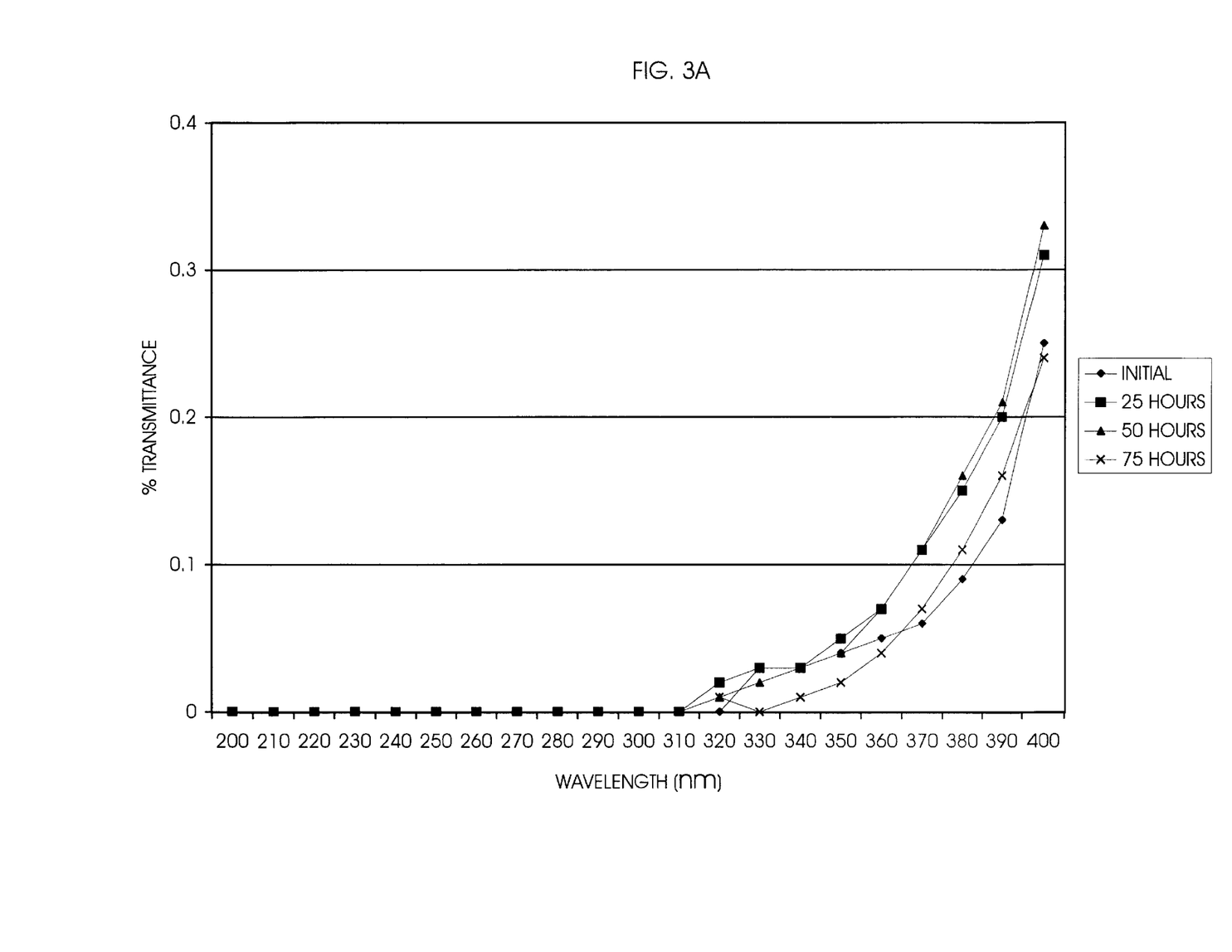
FIGS. 3A, 3B and 4 are graphs of the test data from Example 2.
Figure 3B:
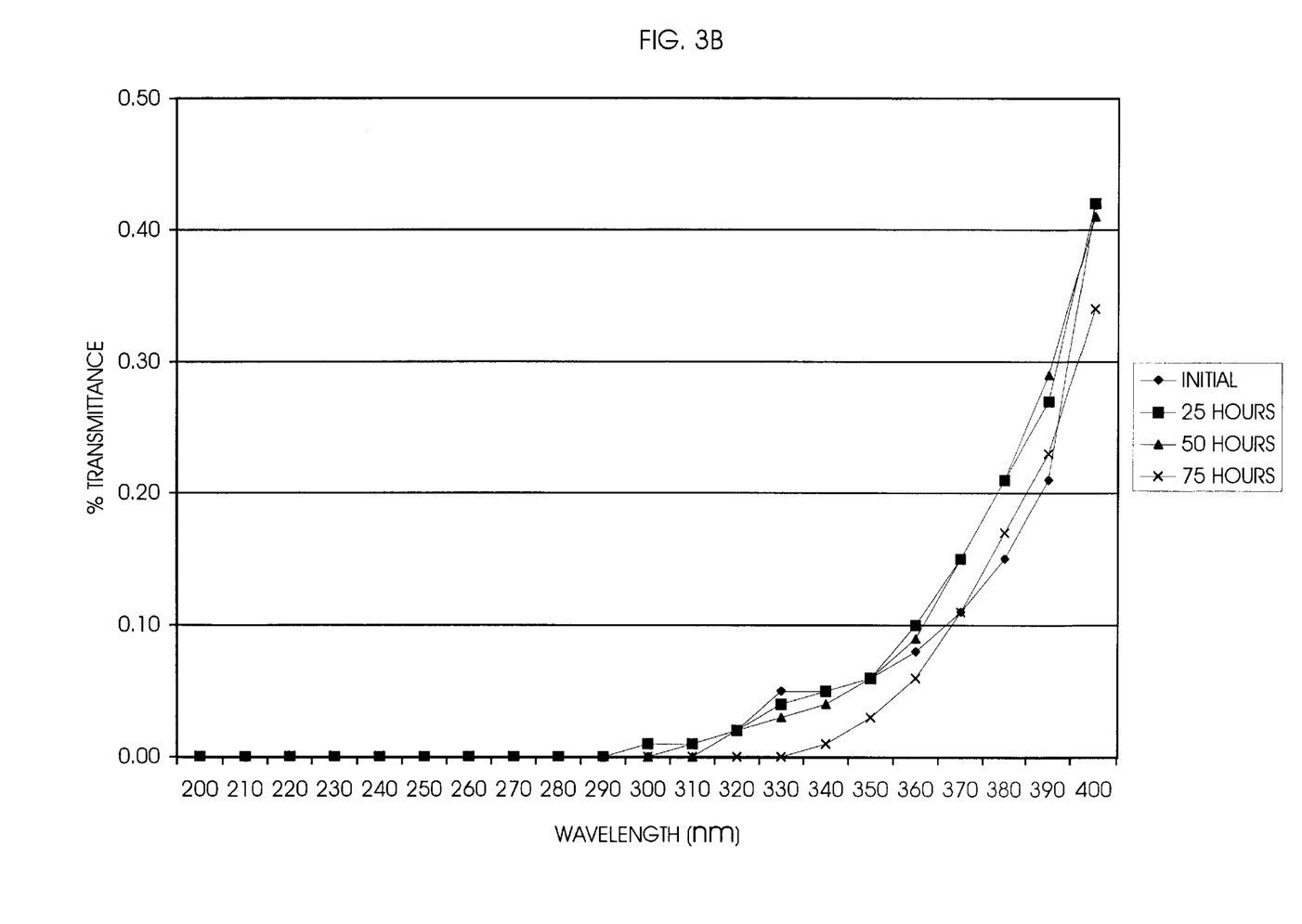

The data in Tables III and IV are graphically shown in FIGS. 3A and 3B. As can be seen, the sample in this test substantially blocks the UV radiation, with only a slight increase in transmittance above about 300 nm in wavelength. The data in Tables III and IV represent tests on identical samples.

Table V shows the data from a test for an identical sample as tested in Tables III and IV. However, the opposite side of the sample was exposed to the radiation (i.e., the radiation blocking layer is on top).

TABLE V

| UV Wavelength | INITIAL % Transmissivity | 25 HOURS % Transmissivity | 50 HOURS % Transmissivity | 75 HOURS % Transmissivity |
|---|---|---|---|---|
| 200 nm | 0.00 | 0.00 | 0.00 | 0.00 |
| 210 nm | 0.00 | 0.00 | 0.00 | 0.00 |
| 220 nm | 0.00 | 0.00 | 0.00 | 0.00 |
| 230 nm | 0.00 | 0.00 | 0.00 | 0.00 |
| 240 nm | 0.00 | 0.00 | 0.00 | 0.00 |
| 250 nm | 0.00 | 0.00 | 0.00 | 0.00 |
| 260 nm | 0.00 | 0.00 | 0.00 | 0.00 |
| 270 nm | 0.00 | 0.00 | 0.00 | 0.00 |
| 280 nm | 0.00 | 0.00 | 0.00 | 0.00 |
| 290 nm | 0.00 | 0.00 | 0.00 | 0.00 |
| 300 nm | 0.00 | 0.00 | 0.00 | 0.00 |
| 310 nm | 0.01 | 0.02 | 0.01 | 0.01 |
| 320 nm | 0.04 | 0.03 | 0.02 | 0.02 |
| 330 nm | 0.05 | 0.04 | 0.03 | 0.03 |
| 340 nm | 0.05 | 0.04 | 0.04 | 0.04 |
| 350 nm | 0.06 | 0.05 | 0.05 | 0.05 |
| 360 nm | 0.08 | 0.07 | 0.07 | 0.07 |
| 370 nm | 0.10 | 0.09 | 0.09 | 0.10 |
| 380 nm | 0.14 | 0.13 | 0.13 | 0.15 |
| 390 nm | 0.19 | 0.19 | 0.19 | 0.22 |
| 400 nm | 0.37 | 0.36 | 0.37 | 0.41 |

Figure 4:
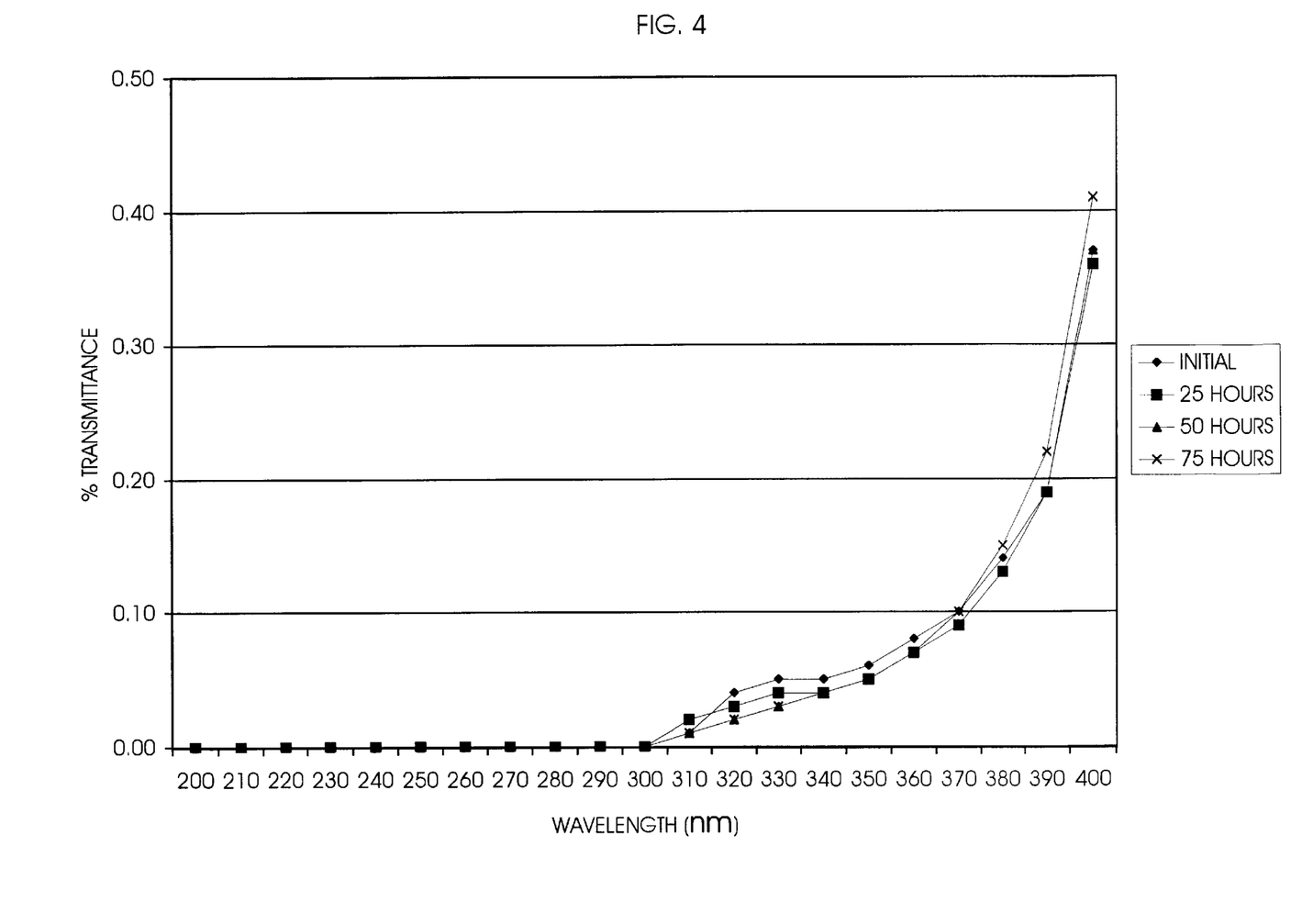

FIG. 4 shows the data for the sample tested in Table V, and again indicates that the sample substantially blocks UV radiation with only a slight increase above 310 nm wavelength.

EXAMPLE THREE

Tables VI and VII below indicate the test data from a 210 denier aqua colored polycotton fabric including a radiation blocking layer (aluminized) with the fabric layer exposed to the radiation.

TABLE VI

| UV Wavelength | INITIAL % Transmissivity | 25 HOURS % Transmissivity | 50 HOURS % Transmissivity | 75 HOURS % Transmissivity |
|---|---|---|---|---|
| 200 nm | 0.00 | 0.00 | 0.00 | 0.00 |
| 210 nm | 0.00 | 0.00 | 0.00 | 0.00 |
| 220 nm | 0.00 | 0.00 | 0.00 | 0.00 |
| 230 nm | 0.00 | 0.00 | 0.00 | 0.00 |
| 240 nm | 0.00 | 0.00 | 0.00 | 0.00 |
| 250 nm | 0.00 | 0.00 | 0.00 | 0.00 |
| 260 nm | 0.00 | 0.00 | 0.00 | 0.00 |
| 270 nm | 0.00 | 0.00 | 0.00 | 0.00 |
| 280 nm | 0.00 | 0.00 | 0.00 | 0.00 |
| 290 nm | 0.00 | 0.00 | 0.00 | 0.00 |
| 300 nm | 0.00 | 0.00 | 0.00 | 0.00 |
| 310 nm | 0.00 | 0.01 | 0.01 | 0.00 |
| 320 nm | 0.02 | 0.01 | 0.00 | 0.00 |
| 330 nm | 0.01 | 0.01 | 0.01 | 0.00 |
| 340 nm | 0.01 | 0.01 | 0.01 | 0.00 |
| 350 nm | 0.01 | 0.01 | 0.01 | 0.00 |
| 360 nm | 0.02 | 0.01 | 0.01 | 0.01 |
| 370 nm | 0.02 | 0.01 | 0.02 | 0.01 |
| 380 nm | 0.03 | 0.02 | 0.02 | 0.02 |
| 390 nm | 0.04 | 0.03 | 0.04 | 0.03 |
| 400 nm | 0.08 | 0.06 | 0.07 | 0.07 |

TABLE VII

| UV Wavelength | INITIAL % Transmissivity | 25 HOURS % Transmissivity | 50 HOURS % Transmissivity | 75 HOURS % Transmissivity |
|---|---|---|---|---|
| 200 nm | 0.00 | 0.00 | 0.00 | 0.00 |
| 210 nm | 0.00 | 0.00 | 0.00 | 0.00 |
| 220 nm | 0.00 | 0.00 | 0.00 | 0.00 |
| 230 nm | 0.00 | 0.00 | 0.00 | 0.00 |
| 240 nm | 0.00 | 0.00 | 0.00 | 0.00 |
| 250 nm | 0.00 | 0.00 | 0.00 | 0.00 |
| 260 nm | 0.00 | 0.00 | 0.00 | 0.00 |
| 270 nm | 0.00 | 0.00 | 0.00 | 0.00 |

TABLE VII-continued

| UV Wavelength | INITIAL % Transmissivity | 25 HOURS % Transmissivity | 50 HOURS % Transmissivity | 75 HOURS % Transmissivity |
|---|---|---|---|---|
| 280 nm | 0.00 | 0.00 | 0.00 | 0.00 |
| 290 nm | 0.00 | 0.00 | 0.00 | 0.00 |
| 300 nm | 0.00 | 0.00 | 0.00 | 0.00 |
| 310 nm | 0.01 | 0.00 | 0.00 | 0.00 |
| 320 nm | 0.01 | 0.00 | 0.00 | 0.00 |
| 330 nm | 0.02 | 0.01 | 0.01 | 0.00 |
| 340 nm | 0.02 | 0.01 | 0.01 | 0.00 |
| 350 nm | 0.02 | 0.01 | 0.01 | 0.01 |
| 360 nm | 0.02 | 0.02 | 0.02 | 0.01 |
| 370 nm | 0.03 | 0.02 | 0.02 | 0.02 |
| 380 nm | 0.04 | 0.03 | 0.03 | 0.03 |
| 390 nm | 0.06 | 0.05 | 0.05 | 0.05 |
| 400 nm | 0.10 | 0.08 | 0.08 | 0.08 |

Figure 5A:
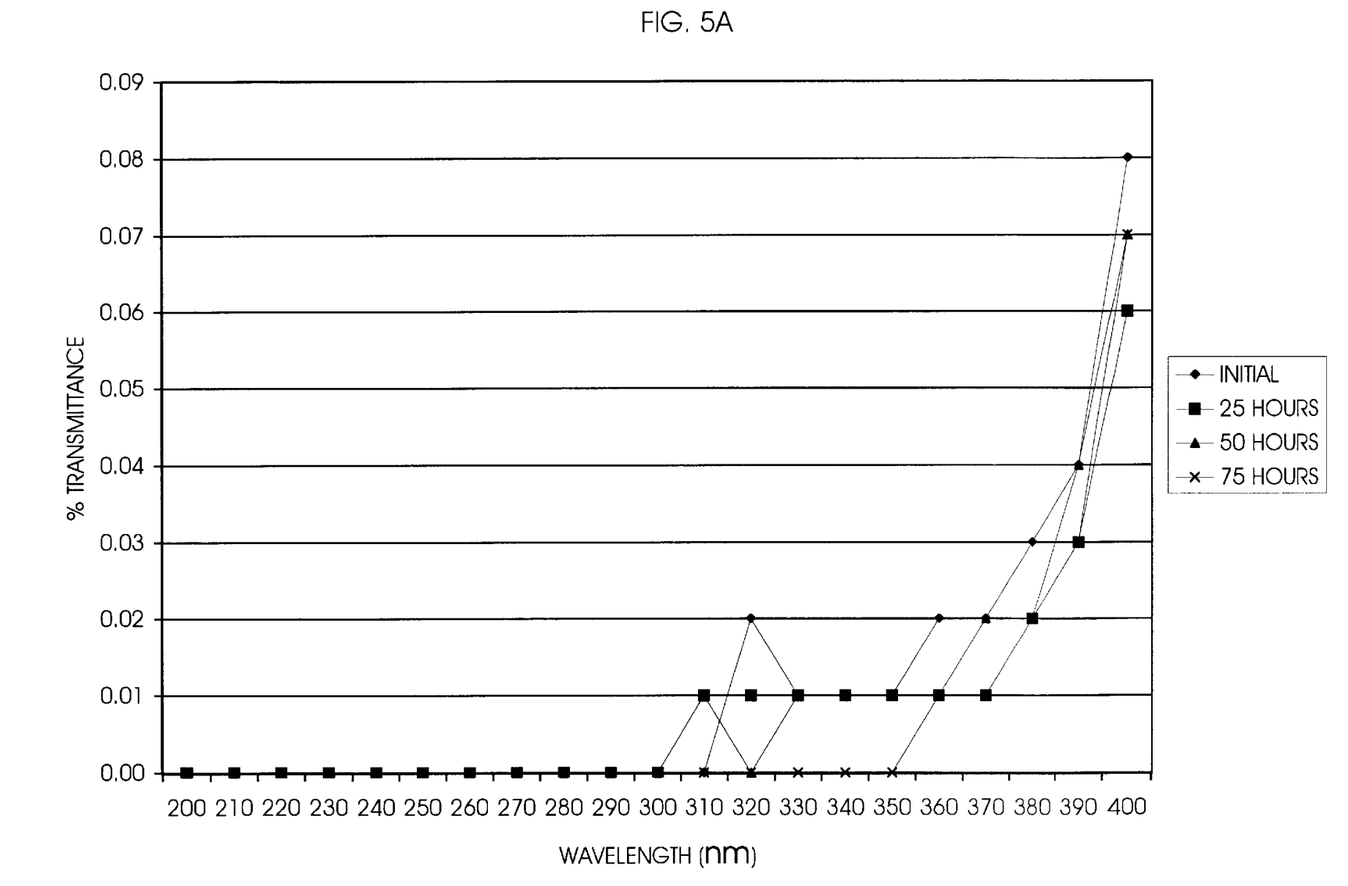
FIGS. 5A, 5B and 6 are graphs of the test data from Example 3.
Figure 5B:
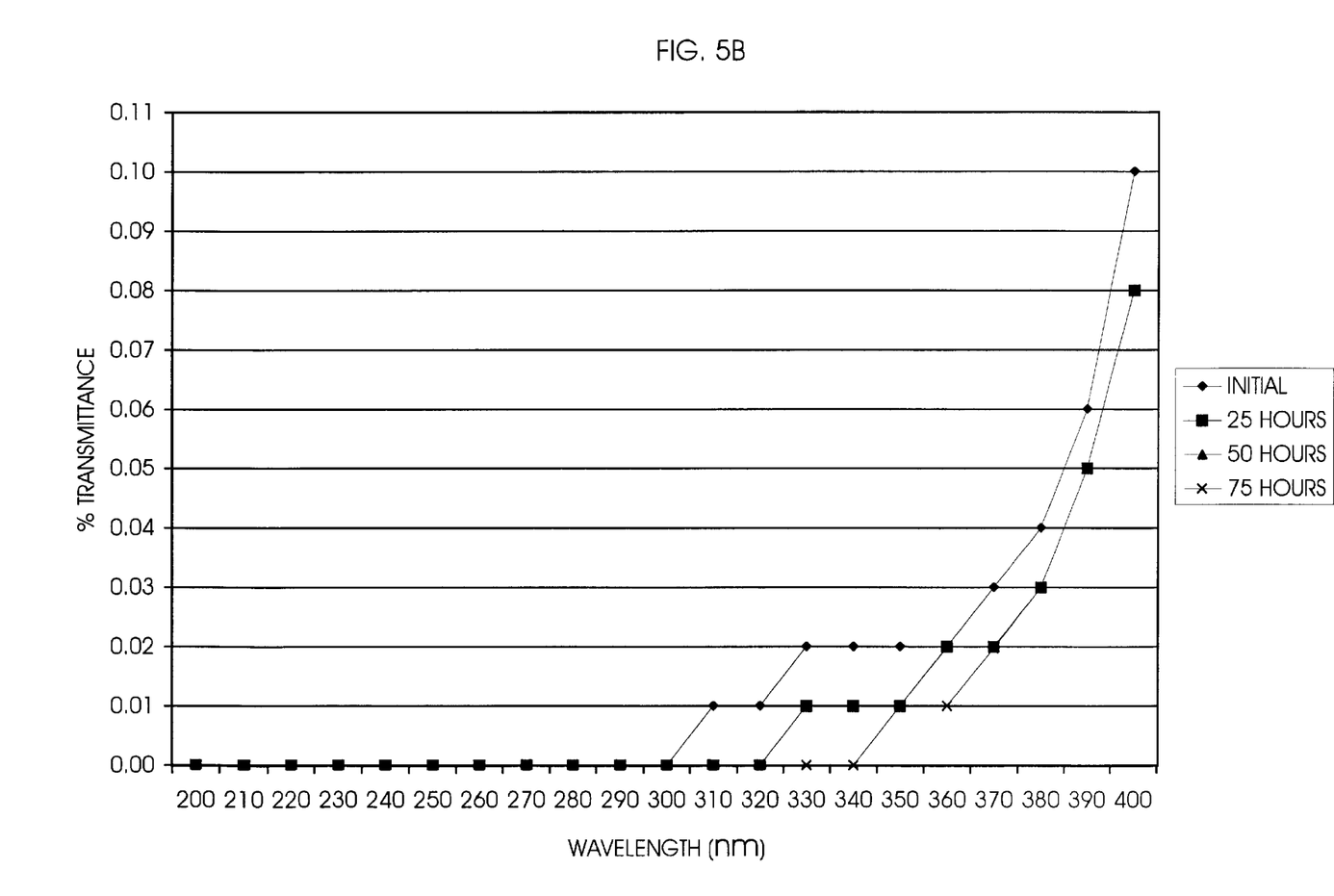

FIGS. 5A and 5B graphically show the data from Tables VI and VII above. As can be seen, the data for this example indicates that the UV is substantially blocked with a slight increase above 310 nm wavelength. The data in Table VI and VII represent tests on identical samples. Also, it should be appreciated that this example provides a stronger blocking factor than the previous data shown in Tables III, IV, and V.

Table VIII shows the test data from the identical fabric tested in Tables VI and VII with the opposite side exposed (i.e., inverted) to the radiation (i.e., with the radiation blocking layer on top).

TABLE VIII

| INITIAL % Transmissivity | 25 HOURS % Transmissivity | 50 HOURS % Transmissivity | 75 HOURS % Transmissivity |
|---|---|---|---|
| 0.00 | 0.00 | 0.00 | 0.00 |
| 0.00 | 0.00 | 0.00 | 0.00 |
| 0.00 | 0.00 | 0.00 | 0.00 |
| 0.00 | 0.00 | 0.00 | 0.00 |
| 0.00 | 0.00 | 0.00 | 0.00 |
| 0.00 | 0.00 | 0.00 | 0.00 |
| 0.00 | 0.00 | 0.00 | 0.00 |
| 0.00 | 0.00 | 0.00 | 0.00 |
| 0.00 | 0.00 | 0.00 | 0.00 |
| 0.00 | 0.00 | 0.00 | 0.00 |
| 0.00 | 0.00 | 0.00 | 0.00 |
| 0.00 | 0.01 | 0.01 | 0.00 |
| 0.01 | 0.01 | 0.01 | 0.01 |
| 0.02 | 0.01 | 0.01 | 0.02 |
| 0.02 | 0.01 | 0.02 | 0.04 |
| 0.02 | 0.02 | 0.02 | 0.05 |
| 0.03 | 0.03 | 0.03 | 0.07 |
| 0.04 | 0.03 | 0.04 | 0.08 |
| 0.04 | 0.03 | 0.04 | 0.08 |
| 0.04 | 0.03 | 0.04 | 0.08 |
| 0.04 | 0.03 | 0.04 | 0.08 |

Figure 6:
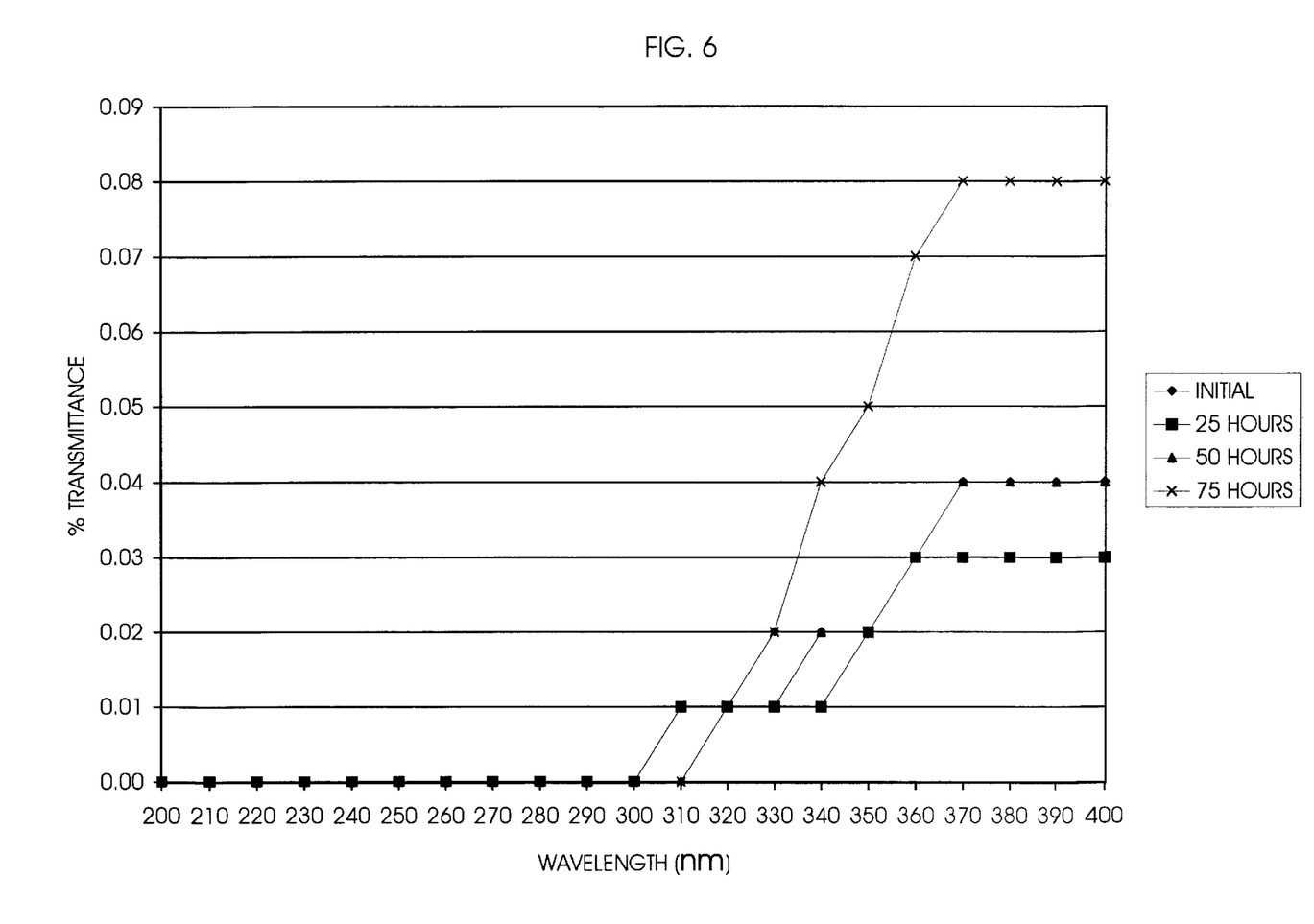

FIG. 6 graphically shows the data from Table VIII and again indicates that the UV radiation is substantially blocked with a slight increase above 310 nm. The data in Table VIII indicates that a slightly higher percentage transmittance factor for the inverted test sample.

The following Examples 4–7 relate to the percentage of IR radiation transmitted for the various test materials.

EXAMPLE FOUR

Table IX indicates test data for transmittance versus wavelength for the infrared spectrum for a sample 210 denier multi-colored polycotton fabric without a radiation blocking layer fabric.

TABLE IX

| Wavelength (nanometers) | Percent Spectral Transmittance | Wavelength (nanometers) | Percent Spectral Transmittance |
|---|---|---|---|
| 750 | 16.1 | 1650 | 38.49 |
| 800 | 27.52 | 1700 | 38.51 |
| 850 | 34.89 | 1750 | 39.68 |
| 900 | 37.63 | 1800 | 40.56 |
| 950 | 39.12 | 1850 | 40.60 |
| 1000 | 40.16 | 1900 | 40.86 |
| 1050 | 40.98 | 1950 | 39.25 |
| 1100 | 41.12 | 2000 | 40.59 |
| 1150 | 41.74 | 2050 | 37.10 |
| 1200 | 42.26 | 2100 | 32.09 |
| 1250 | 42.91 | 2150 | 31.36 |
| 1300 | 43.27 | 2200 | 34.36 |
| 1350 | 42.82 | 2250 | 27.49 |
| 1400 | 41.36 | 2300 | 25.46 |
| 1450 | 39.82 | 2350 | 23.53 |
| 1500 | 39.34 | 2400 | 24.64 |
| 1550 | 39.89 | 2450 | 21.18 |
| 1600 | 40.59 | 2500 | 21.68 |

Figure 7:
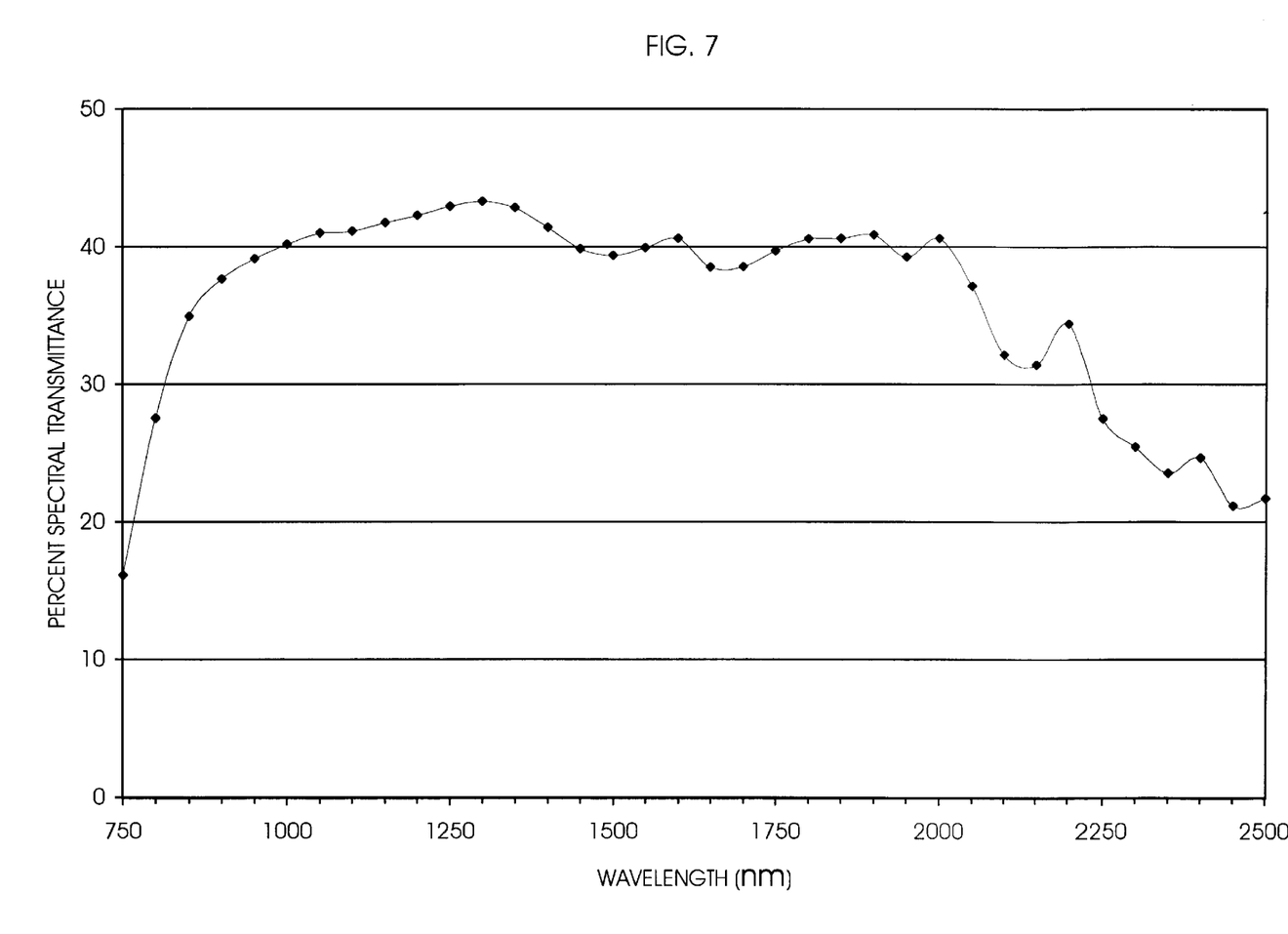
FIG. 7 is a graph of the test data from Example 4.

FIG. 7 shows a graph of the data in Table IX and shows that a very substantial portion of IR radiation is transmitted through the sample fabric. The average percentage of IR transmittance over the measured wavelengths is 35.8% (Blocking 64.2%).

EXAMPLE FIVE table X shows test data for a 210 denier blue colored nylon sample including a radiation blocking layer with the colored fabric side exposed to the radiation.

TABLE X

| Wavelength (nanometers) | Percent Spectral Transmittance | Wavelength (nanometers) | Percent Spectral Transmittance |
|---|---|---|---|
| 750 | 2.39 | 1650 | 2.41 |
| 800 | 2.85 | 1700 | 2.01 |
| 850 | 3.62 | 1750 | 1.77 |
| 900 | 4.03 | 1800 | 1.78 |
| 950 | 4.27 | 1850 | 1.76 |
| 1000 | 4.27 | 1900 | 1.62 |
| 1050 | 4.21 | 1950 | 1.47 |
| 1100 | 4.09 | 2000 | 1.37 |
| 1150 | 4.01 | 2050 | 1.11 |
| 1200 | 3.73 | 2100 | 1.17 |
| 1250 | 3.73 | 2150 | 0.965 |
| 1300 | 3.61 | 2200 | 0.881 |
| 1350 | 3.38 | 2250 | 0.821 |
| 1400 | 3.01 | 2300 | 0.518 |
| 1450 | 2.88 | 2350 | 0.482 |
| 1500 | 2.69 | 2400 | 0.453 |
| 1550 | 2.56 | 2450 | 0.574 |
| 1600 | 2.50 | 2500 | 0.208 |

Figure 8:
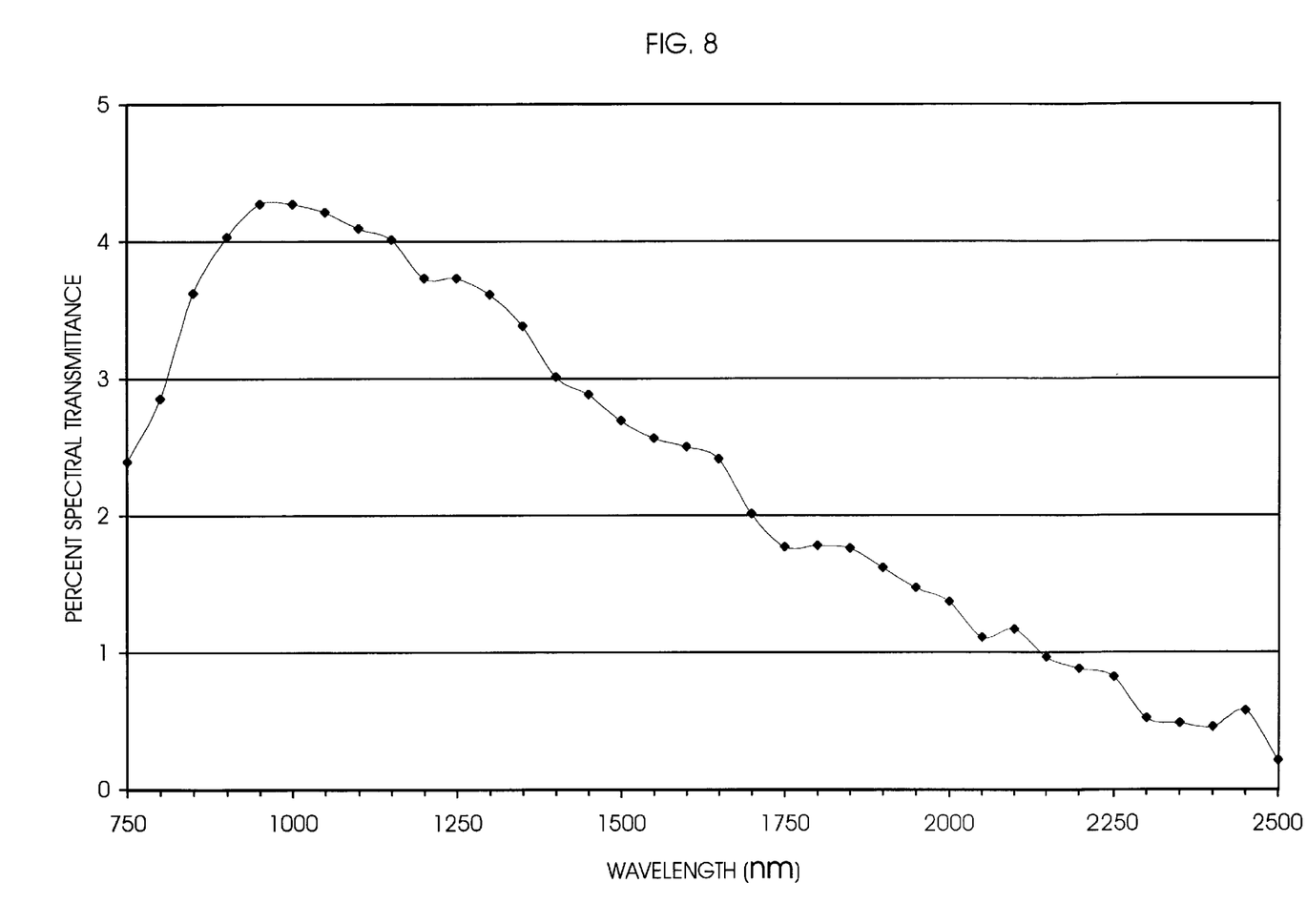
FIG. 8 is a graph of the test data from Example 5.

FIG. 8 graphically shows the test data in Table X. As can be seen, the test sample substantially blocks the IR radiation and has an average transmittance of 2.31% over the range of wavelengths tested (Blocking 97.69%).

EXAMPLE SIX

Table XI shows test data for a 150 denier green patterned polyester sample including a radiation blocking layer (aluminized) with the fabric side exposed to the radiation.

TABLE XI

| Wavelength (nanometers) | Percent Spectral Transmittance | Wavelength (nanometers) | Percent Spectral Transmittance |
| --- | --- | --- | --- |
| 750 | 0.0664 | 1650 | 0.765 |
| 800 | 0.191 | 1700 | 0.688 |
| 850 | 0.645 | 1750 | 0.701 |
| 900 | 1.09 | 1800 | 0.687 |
| 950 | 1.28 | 1850 | 0.7 |
| 1000 | 1.35 | 1900 | 0.674 |
| 1050 | 1.34 | 1950 | 0.617 |
| 1100 | 1.30 | 2000 | 0.623 |
| 1150 | 1.26 | 2050 | 0.579 |
| 1200 | 1.26 | 2100 | 0.492 |
| 1250 | 1.24 | 2150 | 0.428 |
| 1300 | 1.20 | 2200 | 0.452 |
| 1350 | 1.13 | 2250 | 0.253 |
| 1400 | 1.03 | 2300 | 0.228 |
| 1450 | 1.01 | 2350 | 0.14 |
| 1500 | 1.01 | 2400 | 0.275 |
| 1550 | 0.993 | 2450 | 0.308 |
| 1600 | 0.955 | 2500 | 0.206 |

Figure 9:
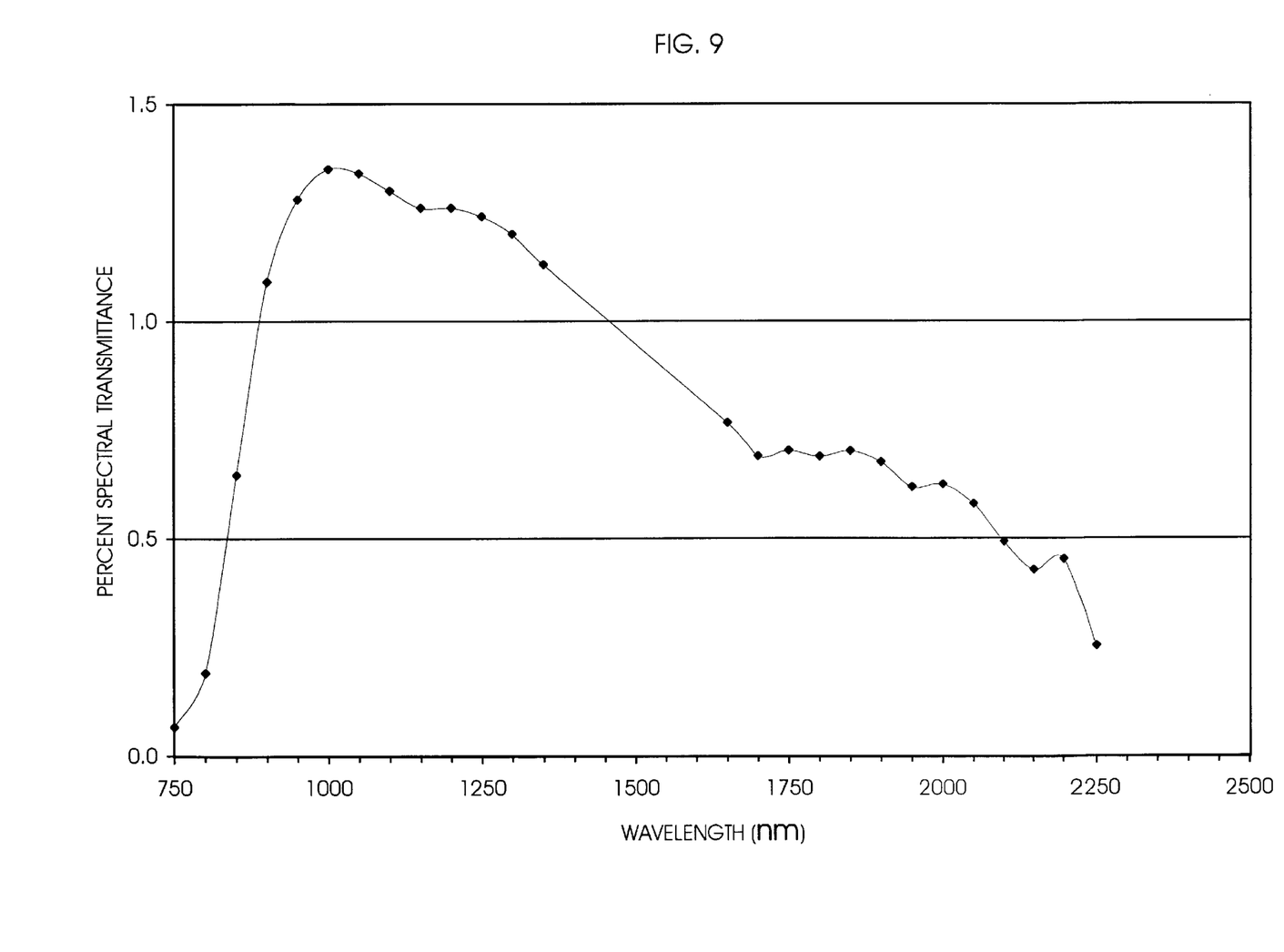
FIG. 9 is a graph of the test data from Example 6.

FIG. 9 graphically shows the test data in Table XI. As can be seen, the test data show an improved performance over the prior example, and have an average percent IR transmittance of 0.75% (Blocking 99.25%).

EXAMPLE SEVEN

Table XII shows test data for 150 denier aqua colored polyester sample including a radiation blocking layer (aluminized) with the fabric side exposed to the radiation.

TABLE XII

| Wavelength (nanometers) | Percent Spectral Transmittance | Wavelength (nanometers) | Percent Spectral Transmittance |
| --- | --- | --- | --- |
| 750 | 0.356 | 1650 | 0.7 |
| 800 | 0.586 | 1700 | 0.664 |
| 850 | 0.867 | 1750 | 0.649 |
| 900 | 1.1 | 1800 | 0.623 |
| 950 | 1.19 | 1850 | 0.622 |
| 1000 | 1.21 | 1900 | 0.578 |
| 1050 | 1.2 | 1950 | 0.533 |
| 1100 | 1.16 | 2000 | 0.515 |
| 1150 | 0.99 | 2050 | 0.457 |
| 1200 | 0.933 | 2100 | 0.428 |
| 1250 | 0.892 | 2150 | 0.308 |
| 1300 | 0.84 | 2200 | 0.325 |
| 1350 | 0.769 | 2250 | 0.162 |
| 1400 | 0.693 | 2300 | 0.123 |
| 1450 | 0.687 | 2350 | 0.162 |
| 1500 | 0.69 | 2400 | 0.167 |
| 1550 | 0.69 | 2450 | 0.112 |
| 1600 | 0.672 | 2500 | 0.153 |

Figure 10:
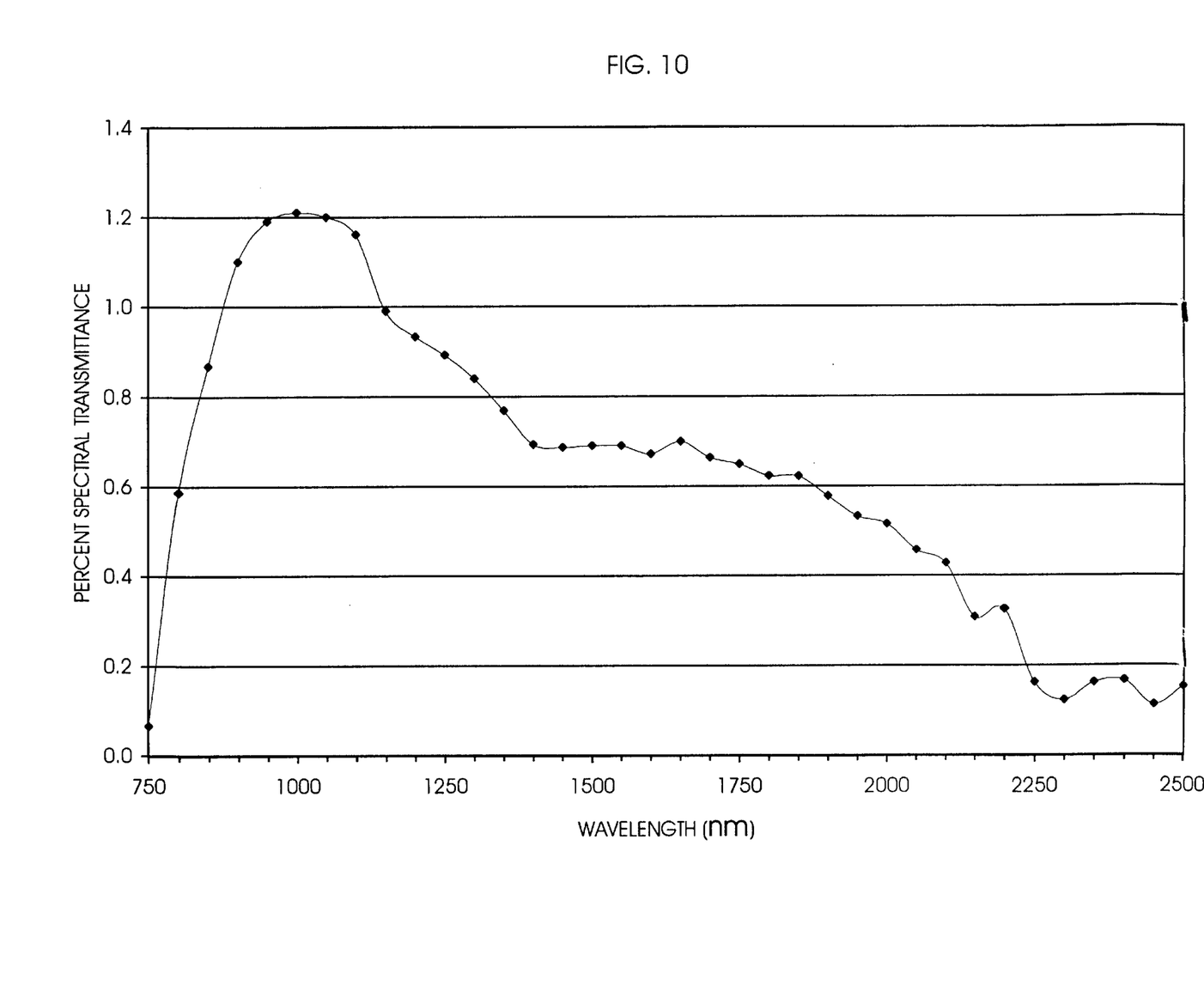
FIG. 10 is a graph of the test data from Example 7.

FIG. 10 shows the test data in Table XII, and indicates even further improved performance. The average IR transmittance is 0.63% for this sample (Blocking 99.37%).

It will be apparent to those skilled in the art that various modifications and variations can be made in the improved material for use in a canopy of the present invention and in construction of this canopy without departing from the scope or spirit of the invention.

Other embodiments of the invention will be apparent to those skilled in the art from consideration of the specification and practice of the invention disclosed herein. It is intended that the specification and examples be considered as exemplary only, with true scope and spirit of the invention being indicated by the following claims.

What is claimed is:

1. In combination, a juvenile product and a canopy disposed adjacent to the juvenile product and substantially covering a juvenile area in the juvenile product, the canopy comprising:

a fabric layer disposed toward the outdoor elements and away from the juvenile product; and a radiation blocking layer disposed substantially adjacent to the fabric layer and disposed toward an interior of the juvenile product, wherein the radiation blocking layer substantially blocks UV radiation and IR radiation from passing therethrough.

2. The combination as recited in claim 1, wherein the fabric layer comprises a nylon fabric.

3. The combination as recited in claim 1, wherein the fabric layer comprises a polyester fabric.

4. The combination as recited in claim 1, wherein the fabric layer comprises a polycotton fabric.

5. The combination as recited in claim 1, wherein the fabric layer comprises 150–210 denier fabric.

6. The combination as recited in claim 1, wherein the radiation blocking layer comprises a metallized layer.

7. The combination as recited in claim 6, wherein the metallized layer comprises an aluminized layer.

8. The combination as recited in claim 1, wherein the radiation blocking layer is about 16 microns thick.

9. The combination as recited in claim 1, wherein the radiation blocking layer substantially blocks at least about 99.58% of UV radiation.

10. The combination as recited in claim 1, wherein the radiation blocking layer substantially blocks at least about 99.90% of UV radiation.

11. The combination as recited in claim 1, wherein the radiation blocking layer substantially blocks at least about 99.92% of UV radiation.

12. The combination as recited in claim 1, wherein the radiation blocking layer substantially blocks at least about 96.69% of IR radiation.

13. The combination as recited in claim 1, wherein the radiation blocking layer substantially blocks at least about 99.25% of IR radiation.

14. The combination as recited in claim 1, wherein the radiation blocking layer substantially blocks at least about 99.37% of IR radiation.

15. The combination as recited in claim 1, further comprising a bonding layer disposed between the fabric layer and the radiation blocking layer.

16. The combination as recited in claim 15, wherein the bonding layer comprises a polyurethane adhesive.

17. The combination as recited in claim 15, wherein the bonding layer comprises a PET film.

18. In combination, a juvenile product and a canopy disposed adjacent to the juvenile product and substantially covering a juvenile area in the juvenile product, the canopy comprising:

a fabric layer disposed toward the outdoor elements and away from the juvenile product; and a radiation blocking layer disposed substantially adjacent to the fabric layer and disposed toward an interior of the juvenile product, wherein the radiation blocking layer substantially blocks UV radiation and IR radiation from passing therethrough; and a bonding layer disposed between the fabric layer and the radiation blocking layer.

19. The combination as recited in claim 18, wherein the bonding layer comprises a polyurethane adhesive.

20. The combination as recited in claim 18, wherein the bonding layer comprises a PET film.

* * * * *